UNITED STATES PATENT OFFICE.

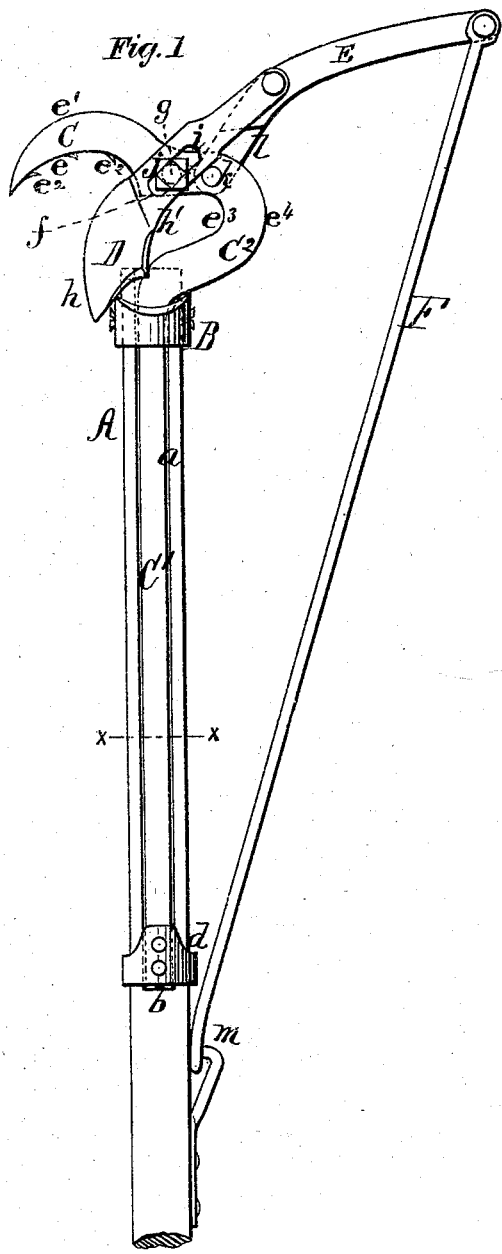
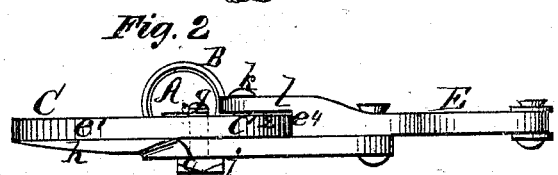

JOHN CHRISTY, OF CLYDE, OHIO.

IMPROVEMENT IN PRUNING-HOOKS.

Specification forming part of Letters Patent No. 143,962, dated October 23, 1873; application filed October 3, 1873.

*To all whom it may concern:*

Be it known that I, JOHN CHRISTY, of Clyde, in the county of Sandusky and State of Ohio, have invented certain new and useful Improvements in Pruning-Hooks; and I do hereby declare that the following is a full, clear, and exact description thereof, reference being had to the accompanying drawing, making part of this specification, in which—

Figure 1 is a side elevation of my improved pruning-hook. Fig. 2 is a top view of the same. Fig. 3 is a horizontal section in the line $x\ x$ of Fig. 1 on a larger scale.

Similar letters of reference indicate corresponding parts in the several figures.

My invention relates exclusively to that style of pruning implement which has its blade arranged to be closed by a downward pull upon the handle of the implement. My first improvement consists in forming the hook from the base of its bill with a concavo-convex extension behind its vertical tang, so as to afford a support for two pivots, one behind the other, and a lateral bearing for the blade and for the lever, all in rear of the said base of the bill of the hook; and, further, so as to have this extension act, in combination with the shoulder of the lever, in such a manner that the motion of the blade toward the bill is arrested when the concave bill of the hook and the convex edge of the blade have come together and severed the limb or twig of a tree or bush. My second improvement consists in the combination, with the vertically-moving handle, of the hook constructed with a concavo-convex bill and a concavo-convex rear extension from the base of said bill; a draw-cut blade with a convex edge, and a slot at the point where it is connected with the hook; a bent shouldered lever, which is connected to the hook and to the blade by independent pivots; and a long connecting-rod attached to the lever and to the handle, all as will be hereinafter described.

In the accompanying drawings, A represents the handle, made of circular form and grooved along the upper portion of its length, as at $a$, said groove being rectangular in form, and extending down a distance equal to the length of the tang of the hook, until it terminates in a square shoulder, $b$. This groove is of a depth and width corresponding to the width and thickness of the said tang, as shown in Fig. 3. B is an adjustable collar placed around the upper end of the handle and secured by screws, so as to be adjustable up or down to suit the length of the tang. C is the hook, with a circular collar, $d$, on the lower end of the tang $C^1$ thereof. The bill of the hook is concavo-convex, as at $e\ e^1$, and has an extension, $C^2$, in rear of the base of the bill, which is bent also into a concavo-convex form, as shown at $e^3\ e^4$. On the concave surface of the bill sharp barbs $e^2$ are forged, in order to hold upon the limb or twig while the implement is being operated. Between these two concave and convex surfaces of the hook there is a slight partition, as at $f$, and at this point a blade, D, is pivoted, as shown at $g$. The blade is convex at its cutting-edge, and concave on its back, as at $h\ h'$. The pivot $g$ is stationary on the hook, and extends through an oblong slot, $i$, in the blade, and receives on its end a nut, $j$, as shown. The form of the bill-edge of the blade and the slot enables the implement to work with a drawing cut. The blade extends back beyond the pivot $g$, and is again pivoted by its extremity to a lever, E, which is pivoted to the rear extension $C^2$ of the hook, as at $k$. This lever is formed by cutting away a portion of its metal at its front end, so as to form an oblique shoulder, as at $l$. By this means the shoulder of the lever stands over the top of the extension of the hook when the implement is open, and comes down behind said extension and bears against it, and acts as a stop when the implement is fully closed. This prevents the implement being strained by closing the blade and hook to too great an extent. The lever is extended some distance beyond its pivot $k$, so as to give the necessary purchase, and is then connected to the long rod F, which extends down obliquely, and connects by a hook and eye with the handle just below the sliding collar $d$ of the tang of the hook, as indicated at $m$.

I am aware that the principle of closing a blade upward against a hook by a downward pull of the handle is old; but I am not aware that the drawing cut, by means of a slotted blade, has ever been obtained in pruning-hooks working on said principle; nor am I aware that the hook has ever been made with a rear extension, $C^2$, beyond the base of the bill, upon which the blade could open so as to have a lateral support and bearing, and upon which the lever E could swing, and also have a lateral support and bearing, and also against which the shoulder of the lever could come in contact and the motion of the blade of the implement be arrested; nor am I aware that in an implement working on said principle the blade has been supported so as to have two pivots and two lateral bearing-faces to move upon and against in such a manner as to be relieved of the twisting strain caused by the resistance of the limb being cut off; nor am I aware that the blade has been attached to a lever, E, by its rear pivot, so that it may be set farther from or nearer to the pivot of the lever. Therefore, while I do not claim pruning-hooks which operate on the general principle herein set forth.

What I do claim as new, and desire to secure by Letters Patent, is—

1. The double bend in the hook above the tang, one bend being in rear of and the other in front of the tang, as and for the purpose described.

2. The combination of the hook with its two bends, C C², and tang C¹, as described, the pivoted slotted blade D with convex edge, the shouldered lever E, the connecting-rod F, and the handle A, substantially as described.

JOHN CHRISTY.

Witnesses:
S. W. REED,
C. W. BENFER.